(12) United States Patent
Marcelot et al.

(10) Patent No.: US 8,109,082 B2
(45) Date of Patent: Feb. 7, 2012

(54) SYSTEM AND METHOD FOR ASSISTING REGENERATION OF A DIESEL ENGINE PARTICULATE FILTER

(75) Inventors: Julien Marcelot, Paris (FR); Frank Reyes, Rueil-Malmaison (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 625 days.

(21) Appl. No.: 12/296,103

(22) PCT Filed: Mar. 21, 2007

(86) PCT No.: PCT/FR2007/050976
§ 371 (c)(1),
(2), (4) Date: Oct. 3, 2008

(87) PCT Pub. No.: WO2007/116163
PCT Pub. Date: Oct. 18, 2007

(65) Prior Publication Data
US 2009/0113878 A1 May 7, 2009

(30) Foreign Application Priority Data
Apr. 11, 2006 (FR) ...................................... 06 51309

(51) Int. Cl.
*F01N 3/00* (2006.01)
*F01N 3/10* (2006.01)
(52) U.S. Cl. ................ 60/295; 60/284; 60/285; 60/287; 60/301; 60/274
(58) Field of Classification Search .................... 60/284, 60/285, 287, 301, 297, 274
See application file for complete search history.

(56) References Cited

U.S. PATENT DOCUMENTS

| 2004/0074225 | A1 | 4/2004 | Schaller et al. | |
| 2005/0252198 | A1 | 11/2005 | Okugawa et al. | |
| 2007/0000238 | A1* | 1/2007 | Marlett et al. | 60/286 |
| 2007/0101698 | A1* | 5/2007 | Goulette et al. | 60/284 |
| 2007/0107418 | A1 | 5/2007 | Colignon | |

FOREIGN PATENT DOCUMENTS

| DE | 19753842 A1 | 6/1999 |
| FR | 2862100 A | 5/2005 |
| WO | WO 02/38932 A | 5/2002 |

OTHER PUBLICATIONS

International Search Report mailed Aug. 21, 2007 in PCT/FR2007/050976.

* cited by examiner

*Primary Examiner* — Thomas Denion
*Assistant Examiner* — Michael Carton
(74) *Attorney, Agent, or Firm* — Nicolas E. Seckel

(57) ABSTRACT

The invention concerns a system for assisting regeneration of a particulate filter (6) arranged in an exhaust line (3) of a diesel engine (1) associated with a oxidizing catalyst (7), the engine (1) being equipped with feeding means (8) for injecting into the cylinders thereof at least one post-injection. Said system comprises means (17) for controlling the feeding means (8) in accordance with a strategy for regenerating the filter (6) wherein the feeding means (8) are switched between a first operating mode with post-injection for priming the catalyst (7) and a second operating mode with post-injection for producing an exothermic reaction by the primed catalyst (7). Said system comprises a temperature sensor (18) arranged in the exhaust line (3) upstream of the catalyst (7), and the control means (8) are capable of switching the feeding means (8) between the first and second operating modes based on said sensed temperature.

8 Claims, 3 Drawing Sheets

SYSTEM AND METHOD FOR ASSISTING REGENERATION OF A DIESEL ENGINE PARTICULATE FILTER

The present invention relates to a regeneration assistance system for a particulate filter disposed in an exhaust line of a motor vehicle diesel engine, and more particularly, a regeneration assistance system for a particulate filter associated with an oxidation catalyst disposed in said line upstream of the filter or in the same medium as the latter.

Traditionally, in order to regenerate a particulate filter (PF) disposed in a motor vehicle diesel engine exhaust line, its temperature must be raised to a minimum level for combustion of the soot stored therein, generally around 500° C.

To this end, an oxidation catalyst is disposed in the exhaust line upstream of the filter. This catalyst is capable of burning unburned hydrocarbons present in the engine exhaust gas by catalysis, thereby causing an exotherm generated at the inlet of the particulate filter, thus raising the internal temperature thereof.

In order to ensure that said unburned hydrocarbons are present in the exhaust gas, the engine is equipped with fueling means for injecting fuel into the engine cylinders late—i.e., during the cylinder expansion phase—, an injection of this kind being commonly referred to as a "post-injection".

The catalyst must be at a minimum temperature in order to operate satisfactorily. Below this temperature, the catalyst is not activated, and the too many hydrocarbons in the exhaust gas relative to the catalyst treatment capacity are not being catalyzed, so that they are discharged into the atmosphere.

Regeneration assistance systems are known that have two temperature sensors, one upstream and one downstream of the catalyst, and control means for the engine fuel supply means which:
- determine the activated state of the catalyst as a function of the acquired upstream and downstream temperatures;
- control catalyst activation, when it is determined that the latter is not activated, by directing the fueling means to supply the engine with a first type of post-injection producing a low concentration of unburned hydrocarbons in the exhaust gas; and
- switches the fueling means, when it is determined that the catalyst is activated, to an operating mode with a second type of post-injection producing a higher concentration of unburned hydrocarbons in the exhaust gas. The catalyst is then able to treat said higher concentration of hydrocarbons and thereby produce an exotherm, making it possible to raise the internal temperature of the particulate filter to its regeneration temperature.

This type of regeneration assistance system has two costly temperature sensors specifically dedicated to the particulate filter regeneration application.

The purpose of the present invention is to solve the above-mentioned problem.

To this end, an object of the invention is a regeneration assistance system for a particulate filter disposed in an exhaust line of a motor vehicle diesel engine and associated with an oxidation catalyst disposed in said line, the engine being equipped with fueling means capable of injecting fuel into the cylinders thereof during their expansion phase, during post-injections, said system having control means for the fueling means that are capable of controlling the latter using a particulate filter regeneration strategy in which the control means are capable of switching the fueling means between a first operating mode with a first type of post-injection for activating the oxidation catalyst, and a second operating mode with a second type of post-injection to make the activated catalyst produce an exotherm in order to regenerate the particulate filter, characterized in that it has a single temperature sensor disposed in the exhaust line upstream of the oxidation catalyst, and in that the control means are capable of switching the fueling means between the first and second operating modes as a function of the temperature acquired upstream of the catalyst.

According to particular embodiments, the system has one or more of the following characteristics:
- the control means has first means for selecting a mode from the first and second operating modes of the fueling means using a predetermined hysteresis-type selection law.
- the engine is equipped with air intake means therein, the system has means for acquiring an air flow into the engine, the engine rotation speed and engine load, and the control means have second means for selecting a mode from the first and second operating modes of the fueling means, comprising:
  - means for estimating the temperature downstream of the oxidation catalyst as a function of the temperature acquired upstream thereof, the acquired airflow, the acquired engine speed, the acquired load, and the type of post-injection being applied; and
  - means for selecting a mode from the first and second operating modes of the fueling means as a function of the temperature acquired upstream of the oxidation catalyst and the estimated temperature downstream thereof.

Another object of the invention is a method of assisting regeneration of a particulate filter disposed in an exhaust line of a motor vehicle diesel engine and associated with an oxidation catalyst disposed in said line, the engine being equipped with fueling means capable of injecting fuel into the cylinders thereof during their expansion phase, during post-injections, said method having a step of controlling the fueling means using a particulate filter regeneration strategy that has a sub-step of switching the fueling means between a first operating mode with a first type of post-injection for activating the oxidation catalyst, and a second operating mode with a second type of post-injection to make the activated catalyst produce an exotherm in order to regenerate the particulate filter, characterized in that it has a single temperature measurement step, this step consisting in measuring the temperature upstream of the oxidation catalyst, and in that the sub-step of switching the fueling means between the first and second operating modes is performed as a function of the temperature acquired upstream of the catalyst.

The invention will be more easily understood by reading the following description, given only as an example, and written in relation to the annexed drawings, in which.

Figure 1:
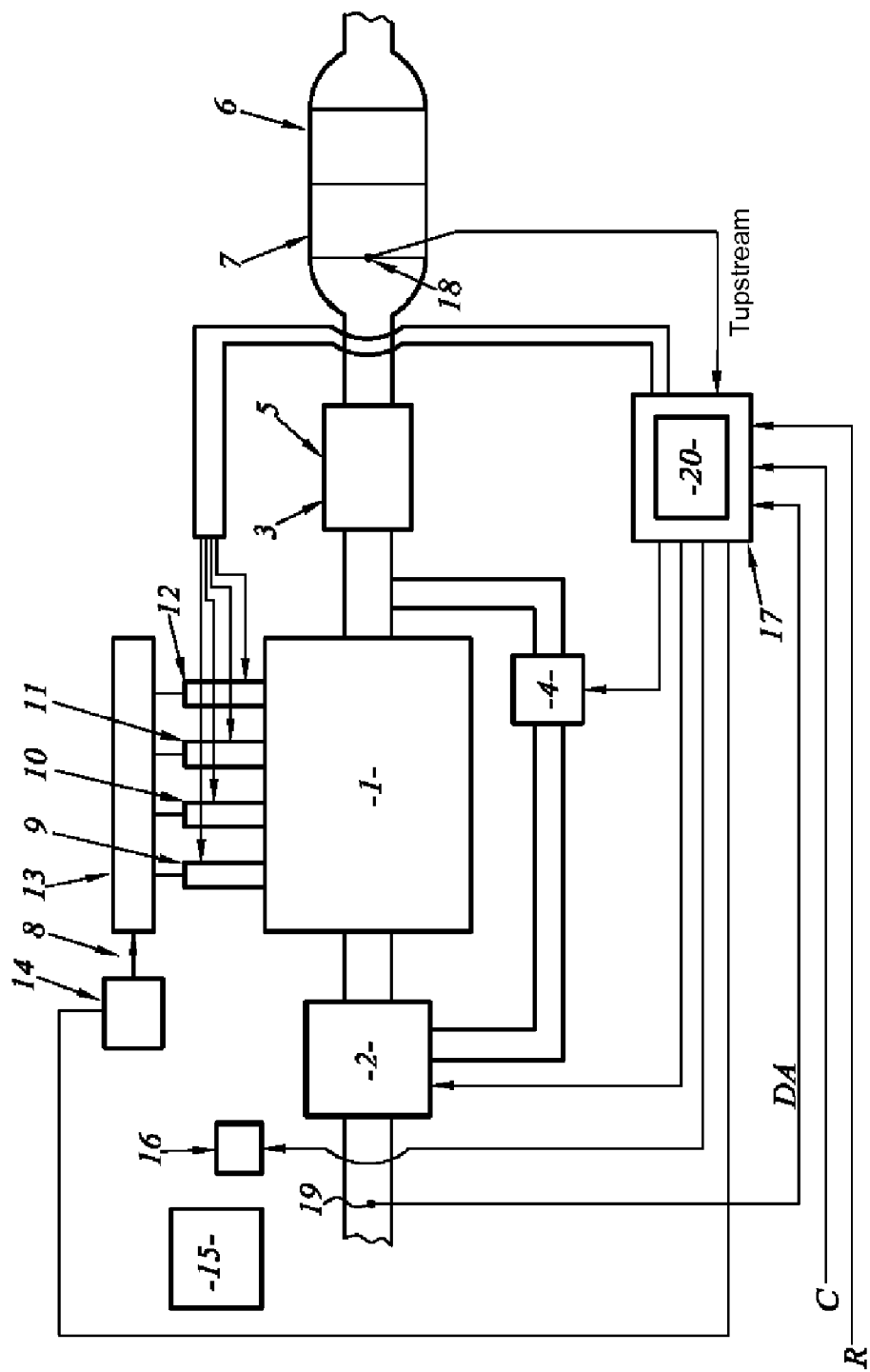
FIG. 1 is a schematic view of a motor vehicle diesel engine equipped with an exhaust line that has a particulate filter downstream of an oxidation catalyst, associated with a system according to the invention.

In FIG. 1, a diesel engine 1 for a motor vehicle is schematically illustrated.

This engine is associated with air intake means 2 at the inlet thereof, and an exhaust line 3 for burned gases. Means 4 for recirculating part of the exhaust gas (EGR) into the engine 1 are also provided, and disposed, for example, between the engine outlet and the air intake means 2, as is known per se.

Traditionally, the exhaust line 3 is also associated with a turbocompressor 5, and more particularly, the turbine part thereof.

In order to reduce the discharge of soot into the atmosphere, the exhaust line 3 comprises a particulate filter 6 capable of storing soot emitted by the engine 1 and an oxidation catalyst 7 disposed upstream of the filter 6 that is capable of catalyzing unburned hydrocarbons present in the engine exhaust gas.

As a variant, the particulate filter and the oxidation catalyst are integrated on a same medium. For example, they are formed of a porous honeycomb medium for soot filtration and impregnated with a catalytic material for the combustion of unburned hydrocarbon.

The catalyst 7 traditionally has at least two operating states, i.e., an operating state where it is activated, in which its internal temperature is high enough to burn high concentrations of hydrocarbons present in the exhaust gas, and an operating state where it is not activated, in which its internal temperature is too low to carry out such an operation.

The catalyst 7 is provided in the exhaust line 3 upstream of the filter 6 in order to generate an exotherm at the filter inlet by oxidizing the unburned hydrocarbons. An effect of this exotherm is to increase the internal temperature of the particulate filter 6 in order to burn the soot contained therein.

The engine 1 is also associated with means 8 for supplying fuel to the cylinders thereof—of which there are four in this example—by means of injectors 9, 10, 11, 12. These injectors 9, 10, 11, 12 are electronically controlled, and can therefore be directed to deliver fuel injections of a desired number, fuel quantity and phasing to the cylinders.

The fueling means 8 comprise a common fuel rail 13 fitted to the injectors 9, 10, 11, 12 and connected to a high-pressure pump 14 in order to be supplied with fuel from a fuel tank 15.

The tank 15 is associated with means for supplementing the fuel with an additive stored in an auxiliary tank 16 and meant to be deposited on the walls of the particulate filter 6 in order to lower the combustion temperature of the soot trapped therein, and thereby assist in filter regeneration.

The engine and the various members just described are also associated with a system for controlling their operation. This system has in particular an information processing unit 17, comprising any appropriate calculator, connected to a predetermined set of means for acquiring information on the operation of the engine, the associated members, and/or vehicle driving conditions.

The unit 17 is designed to send a set of operating control signals to the engine and associated members as a function of the acquired information, as is known per se in the state of the art.

The engine operation control system is specifically adapted to control the fueling means 8 so that it delivers fuel to the cylinders in the form of multiple injections, i.e., at least one main fuel injection and a fuel injection, or post-injection, during the cylinder expansion phase.

The engine operation control system is additionally in charge of controlling regeneration of the particulate filter 6.

To this end, the system is capable of switching the fueling means 8 between a normal engine operating mode and a filter regeneration operating mode.

In the regeneration operating mode, the control system controls the fuel supply means 8 so that they deliver a post-injection to the cylinders, resulting in an increased concentration of unburned hydrocarbons in the exhaust gas.

This post-injection is in the form of one or more distinct fuel injections to the cylinders, or, as a variant, the control system controls the fueling means 8 so that they displace the timing of the main fuel injection to the cylinders toward the expansion phase thereof.

In the filter 6 regeneration operating mode, in accordance with a predetermined switching strategy explained in more detail below, the control system switches the operation of the fueling means 8 between a first sub-mode of operation in which a first type of post-injection is used, hereinafter designated "mode 1", and a second sub-mode of operation in which a second type of post-injection is used, hereinafter designated "mode 2".

The first type of post-injection produces unburned hydrocarbons in the exhaust gas at a low concentration that is still sufficient to activate the catalyst 6. Substantially all of these hydrocarbons are then burned to activate the catalyst, so that substantially no hydrocarbons from this post-injection are discharged into the atmosphere.

The second type of post-injection produces hydrocarbons in the exhaust gases at a higher concentration so that, once the catalyst 7 is activated, it remains in its activated state and generates a high enough exotherm at the inlet of the particulate filter 6 that the internal temperature of the latter reaches the level needed to combust the stored soot.

In order to direct the fueling means 8 to switch its operation between modes 1 and 2, the control system comprises:
- a single temperature sensor 18 placed in the exhaust line 3 upstream of the catalyst 6 and measuring a temperature Tupstream;
- a flow meter 19 disposed at the inlet of the air intake means 2 for measuring the flow DA of fresh gases entering the engine;
- an engine speed sensor (not shown) for measuring the rotational speed R of the engine;
- means for acquiring the engine load C (not shown); and
- a module 20 for selecting the operating mode of the fueling means 8 and connected to the aforementioned sensors and acquisition means, and capable of selecting one of the two modes 1 or 2 as a function of the measurements it receives. The module 20 sends its selection to the portion of unit 17 in charge of controlling the fueling means 8, which responds by switching the operation thereof in order to apply the selected operating mode. The module 20 is comprised in the unit 17, for example.

Figure 2:
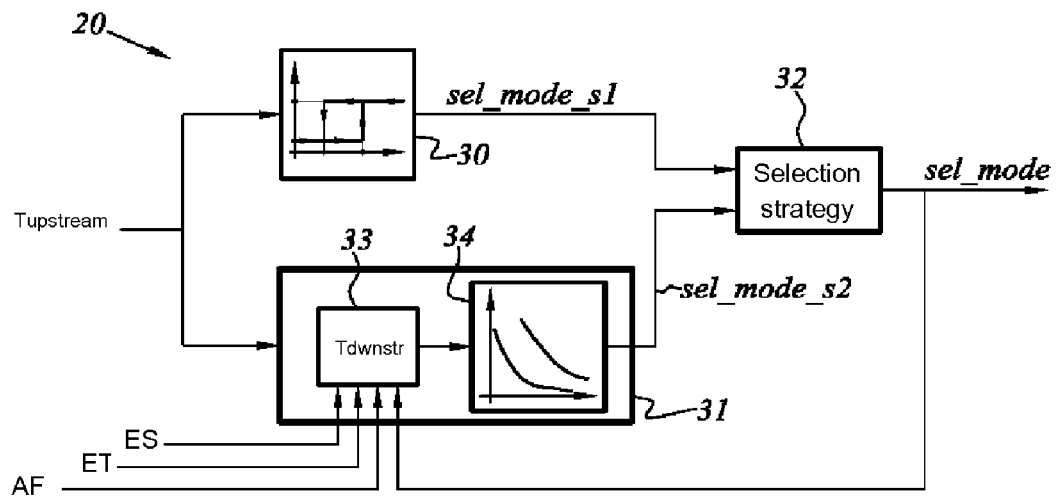
FIG. 2 is a schematic view of a module for selecting the operating mode of the engine fueling means, which is part of the system of FIG. 1.

FIG. 2 is a schematic view of the selection module 20.

This module 20 has first means 30 that select an operating mode from modes 1 and 2 and issues a signal sel_mode_s1 whose value represents the selected mode. The module 20 also has second means 31 that select an operating mode from modes 1 and 2, in a different way from the first means 30, and issues a signal sel_mode_s2 whose value represents the selected mode.

Lastly, the module 20 has third selection means 32 that receive as input the signals sel_mode_s1 and sel_mode_s2. As a function thereof, the third means 32 determine which mode is ultimately chosen, and send a signal sel_mode representing the mode ultimately chosen to the portion of the unit 17 in charge of controlling the fueling means 8.

In a first variant, mode 2 has priority over mode 1. In this way, if the first means 30 select mode 1 and the second means 31 select mode 2, or vice versa, the third means 32 select mode 2.

In a second variant, the third means 32 select operating mode 2 if the first and second means 30, 31 have simultaneously selected the latter.

The operation of the first and second selection means 30, 31 will now be explained.

The first selection means 30 receive the measured temperature Tupstream as input and select operating mode 1 or mode 2 solely as a function thereof. The first means 30 employ a hysteresis-type selection law.

Figure 3:
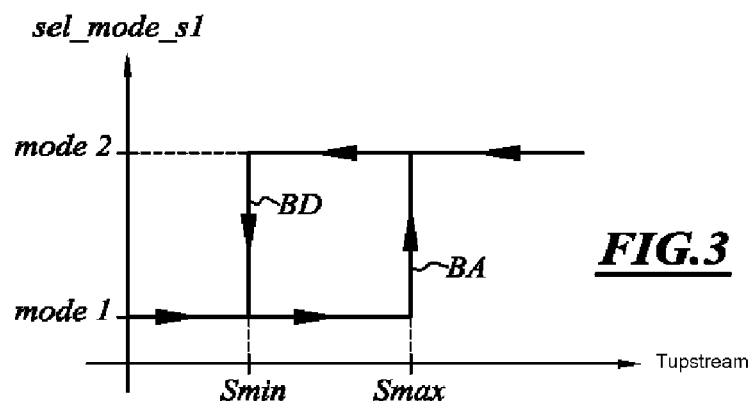
FIG. 3 is a graph of a selection hysteresis used by the module of FIG. 2.

This hysteresis is plotted in FIG. 3, and has the measured temperature Tupstream on the abscissa and the signal mode_sel_s1 on the ordinate. The signal mode_sel_s1 takes a first value—0, for example—for mode 1, and a second value—1, for example—for mode 2, with the second value being greater than the first value.

The ascending leg BA of the hysteresis is defined here by a first, predetermined threshold temperature Smax. For measured temperature values Tupstream greater than Smax, mode 2 is systematically selected by the first means 30. The descending leg BD of the hysteresis is defined by a second threshold value 5 min. For measured temperature values Tupstream lower than 5 min, mode 1 is systematically selected by the means 30. For temperature values Tupstream between the values 5 min and Smax, the selection of mode 1 or mode 2 depends on the temporal evolution of the measured temperature Tupstream, illustrated by the arrows on the hysteresis plot.

The threshold values Smax and 5 min are determined in a prior study in order to describe the relation that exists between the temperature Tupstream upstream of the catalyst and the activated state thereof.

Referring again to FIG. 2, the second selection means 31 receive as input the temperature Tupstream, engine speed ES, engine load EL and air flow AF measurements, as well as the signal sel_mode.

The second selection means 31 comprise means 33 that estimates the temperature Tdownstream at the outlet of the oxidation catalyst 7 as a function of the measurements Tupstream, ES, EL, and AF, and the type of post-injection currently being applied, which is represented by the signal sel_mode, as will be explained in more detail below.

The second selection means 31 also comprise means 34 for determining the selection signal sel_mode_2. They receive the measured temperature Tupstream and the estimated temperature Tdownstream as input and determine the value of the signal sel_mode_2 as a function of predetermined temperature ranges within which the temperature pair (Tupstream, Tdownstream) falls.

Figure 4:
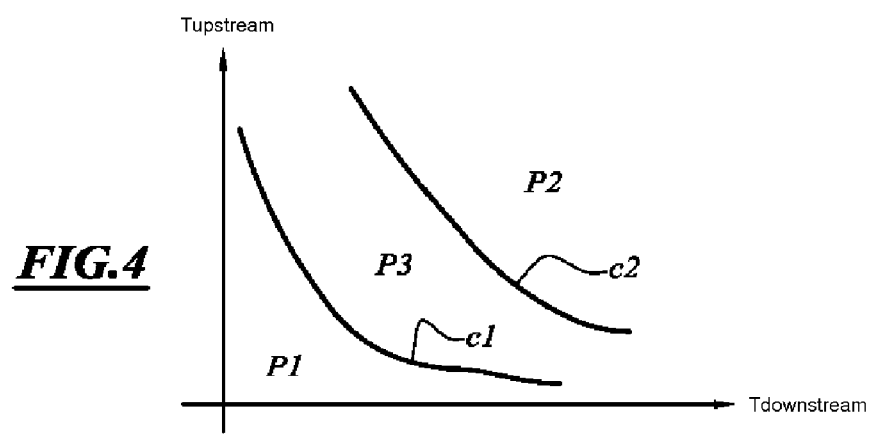
FIG. 4 is a graph of the temperature ranges representative of the operating modes of the engine fuel supply means, used by the module of FIG. 2.

These ranges are illustrated in FIG. 4, a graph with the estimated temperature Tdownstream on the abscissa and the measured temperature Tupstream on the ordinate. This graph has two distinct descending curves C1 and C2 defining a first range P1 corresponding to the area below the curve C1, a second range P2 corresponding to the area above the curve C2, and a third, intermediate range P3 corresponding to the area between the curves C1 and C2.

When the pair (Tupstream, Tdownstream) falls in range P1, the means 34 assign a value representing operating mode 1 to the signal sel_mode_s2. When this pair falls in range P2, the means 33 assign a value representing operating mode 2 to the signal sel_mode_s2.

Lastly, when the pair (Tupstream, Tdownstream) falls within the intermediate range P3, the value of the signal sel_mode_s2 will depend on the history of the values of this pair, with the signal sel_mode_s2 changing value only if the pair of temperatures crosses over curve C1 to enter the range P1 or crosses over curve C2 to enter the range P2. In this way, the intermediate range P3 prevents oscillations in the value of the signal sel_mode_s2, as in a hysteresis.

As a variant, a single curve is used to delineate just two ranges, i.e., the ranges P1 and P2.

The curves C1 and C2 are memorized, for example, in the form of charts in the means 34, and are determined by prior study.

Figure 5:
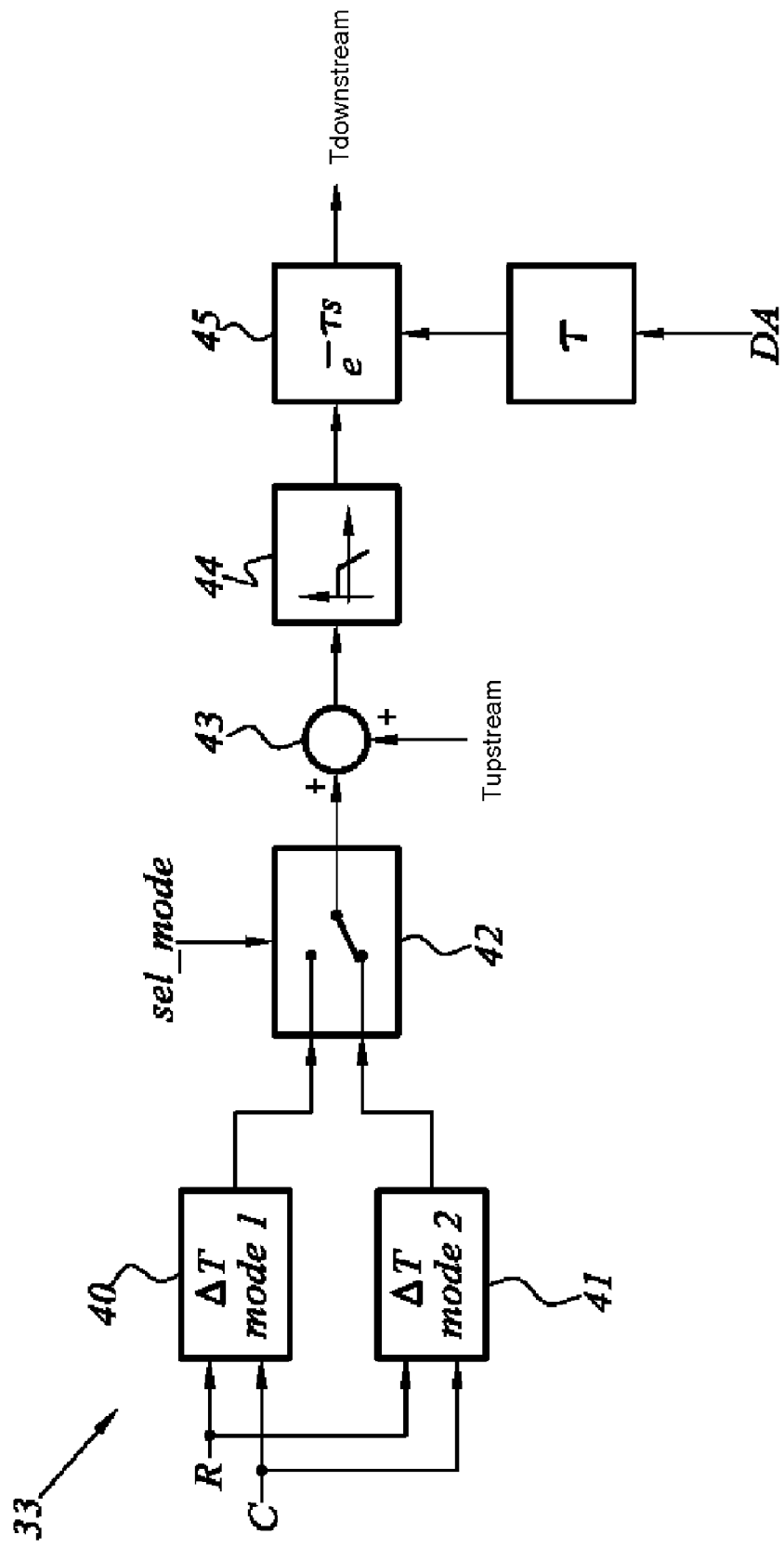
FIG. 5 is a schematic view of means for estimating the temperature downstream of the catalyst, used as an element of the module of FIG. 2.

Referring now to FIG. 5, the means 33 for estimating the temperature Tdownstream downstream of the catalyst comprise first means 40 for determining a temperature change ΔTmode1 generated by burning unburned hydrocarbons from a post-injection of the first type for a given engine speed/engine load pair. To this end, the first means 40 receive the engine speed ES and engine load EL measurements as input and evaluate a predetermined chart of temperature changes as a function of engine speed/load pairs.

Likewise, the estimation means 33 comprise second means 41 similar to the first means 40. This second means 41 determine a temperature change ΔTmode2 generated by burning unburned hydrocarbons from a post-injection of the second type for a given engine speed/engine load pair.

Selection means 42 are connected to the outputs of the first and second means 40, 41 for determining temperature change. They receive the signal sel_mode that represents the post-injection currently being applied. If the signal sel_mode corresponds to mode 1, they select and give as output the temperature change ΔTmode1, and otherwise the temperature change ΔTmode2.

An adder 43 is connected to the selection means 42 to receive the output thereof, and adds it to the measured temperature Tupstream. The adder 43 output is connected to a filter 44 that applies to it a low-pass filtering operation of the type that models processes by which the temperature is smoothed through the oxidation catalyst, due to the thermal inertia of its medium, which is generally made of a ceramic.

The low-pass filter 44, for its part, is connected to a time-delay filter 45 that applies a time lag to the output of the filter 44 and gives the estimated temperature Tdownstream as output. The time lag applied by the filter 45 models the time the exhaust gas takes to go through the oxidation catalyst 7. This time lag is determined by means connected to the time-delay filter 45, as a function of the measured air flow AF, which they receive as input.

Other embodiments are of course possible.

For example, the selection module 20 can comprise just one of the first or second selection means 30, 31, the third selection means 32 then being omitted.

The invention claimed is:

1. System for assisting regeneration of a particulate filter disposed in an exhaust line of a motor vehicle diesel engine, and associated with an oxidation catalyst disposed in line, the engine being equipped with fueling means capable of injecting fuel into the cylinders thereof during their expansion phase, during post-injections, said system comprising: control means for the fueling means that control the fueling means using a particulate filter regeneration strategy in which the control means switch the fueling means between (i) a first operating mode with a first type of post-injection to activate the oxidation catalyst, and (ii) a second operating mode with a second type of post-injection to make the activated catalyst produce an exotherm in order to regenerate the particulate filter, wherein the system comprises a single temperature sensor, the single temperature sensor is disposed in the exhaust line upstream of the oxidation catalyst, the single temperature sensor is connected to the control means, and the control means switch the fueling means between the first and second operating modes as a function of the temperature only acquired upstream of the oxidation catalyst by the single temperature sensor.

2. System according to claim 1, wherein the control means have first means for selecting a mode from the first and second operating modes of the fueling means using a predetermined hysteresis-type selection law.

3. System according to claim 1, wherein the engine is equipped with air intake means therein, the system has means for acquiring an air flow into the engine, the engine rotation speed and engine load, and the control means have second means for selecting a mode from the first and second operating modes of the fueling means, comprising:
   means for estimating the temperature downstream of the oxidation catalyst as a function of the temperature acquired upstream thereof, the acquired airflow, the acquired engine speed, the acquired load, and the type of post-injection being applied; and
   means for selecting a mode from the first and second operating modes of the fueling means as a function of the temperature acquired upstream of the oxidation catalyst and the estimated temperature downstream thereof.

4. Method for assisting regeneration of a particulate filter disposed in an exhaust line of a motor vehicle diesel engine and associated with an oxidation catalyst disposed in said line, the engine being equipped with fueling means capable of injecting fuel into the cylinders thereof during their expansion phase, during post-injections, said method comprising: controlling the fueling means using a particulate filter regeneration strategy of comprising switching the fueling means between a first operating mode with (i) a first type of post-injection to activate the oxidation catalyst, and (ii) a second operating mode with a second type of post-injection to make the activated oxidation catalyst produce an exotherm in order to regenerate the particulate filter, and measuring a temperature upstream of the oxidation catalyst, wherein the switching of the fueling means between the first and second operating modes is performed as a function of the temperature only acquired upstream of the oxidation catalyst.

5. System according to claim 2, wherein the engine is equipped with air intake means therein, the system has means for acquiring an air flow into the engine, the engine rotation speed and engine load, and the control means have second means for selecting a mode from the first and second operating modes of the fueling means, comprising:
   means for estimating the temperature downstream of the oxidation catalyst as a function of the temperature acquired upstream thereof, the acquired airflow, the acquired engine speed, the acquired load, and the type of post-injection being applied; and
   means for selecting a mode from the first and second operating modes of the fueling means as a function of the temperature acquired upstream of the oxidation catalyst and the estimated temperature downstream thereof.

6. Method according to claim 4, wherein, when switching the fueling means between the first and second operating modes, the selection of a mode from the first and second operating modes of the fueling means uses a predetermined hysteresis-type selection law.

7. Method according to claim 4, wherein the engine is equipped with air intake means therein, and the method comprises:
   acquiring an air flow into the engine, the engine rotation speed and engine load;
   estimating the temperature downstream of the oxidation catalyst as a function of the temperature acquired upstream thereof, the acquired airflow, the acquired engine speed, the acquired load, and the type of post-injection being applied; and
   selecting a mode from the first and second operating modes of the fueling means as a function of the temperature acquired upstream of the oxidation catalyst and the estimated temperature downstream thereof.

8. Method according to claim 6, wherein the engine is equipped with air intake means therein, and the method comprises:
   acquiring an air flow into the engine, the engine rotation speed and engine load;
   estimating the temperature downstream of the oxidation catalyst as a function of the temperature acquired upstream thereof, the acquired airflow, the acquired engine speed, the acquired load, and the type of post-injection being applied; and
   selecting a mode from the first and second operating modes of the fueling means as a function of the temperature acquired upstream of the oxidation catalyst and the estimated temperature downstream thereof

* * * * *